United States Patent
Schell et al.

(10) Patent No.: US 9,877,194 B2
(45) Date of Patent: *Jan. 23, 2018

(54) METHODS AND APPARATUS FOR DELIVERING ELECTRONIC IDENTIFICATION COMPONENTS OVER A WIRELESS NETWORK

(71) Applicant: Apple Inc., Cupertino, CA (US)

(72) Inventors: Stephan V. Schell, San Mateo, CA (US); Arun G. Mathias, Sunnyvale, CA (US); Jerrold Von Hauck, Windermere, FL (US); David T. Haggerty, San Francisco, CA (US); Kevin McLaughlin, Mountain View, CA (US); Ben-Heng Juang, Milpitas, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,444

(22) Filed: Apr. 14, 2016

(65) Prior Publication Data

US 2016/0227409 A1   Aug. 4, 2016

Related U.S. Application Data

(63) Continuation of application No. 14/629,386, filed on Feb. 23, 2015, now Pat. No. 9,344,832, which is a (Continued)

(51) Int. Cl.
*H04L 29/06* (2006.01)
*H04W 12/06* (2009.01)
(Continued)

(52) U.S. Cl.
CPC ............ *H04W 12/06* (2013.01); *G06F 21/45* (2013.01); *G06F 21/57* (2013.01); *H04L 63/08* (2013.01);
(Continued)

(58) Field of Classification Search
CPC .................................................. H04L 63/0853
(Continued)

(56) References Cited

U.S. PATENT DOCUMENTS 3,876,942 A    4/1975  Koster et al.
5,386,455 A    1/1995  Cooper et al.
(Continued)

FOREIGN PATENT DOCUMENTS

CN    101222711 A    7/2008
DE    19823074 A1   11/1999
(Continued)

OTHER PUBLICATIONS

WO 2010-102236 A2 "Secure Remote Subscription management" (Meyerstein: Sep. 10, 2010).*
(Continued)

*Primary Examiner* — Longbit Chai
(74) *Attorney, Agent, or Firm* — Downey Brand LLP

(57) ABSTRACT

Methods and apparatus enabling programming of electronic identification information of a wireless apparatus. In one embodiment, a previously purchased or deployed wireless apparatus is activated by a cellular network. The wireless apparatus connects to the cellular network using an access module to download operating system components and/or access control client components. The described methods and apparatus enable updates, additions and replacement of various components including Electronic Subscriber Identity Module (eSIM) data, OS components. One exemplary implementation of the invention utilizes a trusted key exchange between the device and the cellular network to maintain security.

20 Claims, 5 Drawing Sheets

Related U.S. Application Data continuation of application No. 14/049,185, filed on Oct. 8, 2013, now Pat. No. 8,966,262, which is a continuation of application No. 13/111,801, filed on May 19, 2011, now Pat. No. 8,555,067.

(60) Provisional application No. 61/407,862, filed on Oct. 28, 2010.

(51) Int. Cl.
*H04W 4/00* (2009.01)
*H04W 12/08* (2009.01)
*G06F 21/45* (2013.01)
*G06F 21/57* (2013.01)
*H04W 12/04* (2009.01)
*H04L 29/08* (2006.01)

(52) U.S. Cl.
CPC ........ *H04L 63/0853* (2013.01); *H04L 63/123* (2013.01); *H04L 63/20* (2013.01); *H04W 4/001* (2013.01); *H04W 12/04* (2013.01); *H04W 12/08* (2013.01); *H04L 67/34* (2013.01); *H04W 4/003* (2013.01)

(58) Field of Classification Search
USPC ........................................................ 713/169
See application file for complete search history.

(56) References Cited

U.S. PATENT DOCUMENTS

| | | | |
|---|---|---|---|
| 5,835,061 A | 11/1998 | Stewart | |
| 5,915,226 A | 6/1999 | Martineau | |
| 6,061,740 A | 5/2000 | Ferguson et al. | |
| 6,134,435 A | 10/2000 | Zicker et al. | |
| 6,137,783 A | 10/2000 | Sallberg et al. | |
| 6,185,427 B1 | 2/2001 | Krasner et al. | |
| 6,199,045 B1 | 3/2001 | Giniger et al. | |
| 6,259,405 B1 | 7/2001 | Stewart et al. | |
| 6,263,214 B1 | 7/2001 | Yazaki et al. | |
| 6,323,846 B1 | 11/2001 | Westerman et al. | |
| 6,372,974 B1 | 4/2002 | Gross et al. | |
| 6,456,234 B1 | 9/2002 | Johnson | |
| 6,487,403 B2 | 11/2002 | Carroll | |
| 6,570,557 B1 | 5/2003 | Westerman et al. | |
| 6,611,687 B1 | 8/2003 | Clark et al. | |
| 6,615,213 B1 | 9/2003 | Johnson | |
| 6,677,894 B2 | 1/2004 | Sheynblat et al. | |
| 6,677,932 B1 | 1/2004 | Westerman | |
| 6,731,238 B2 | 5/2004 | Johnson | |
| 6,873,609 B1 | 3/2005 | Jones et al. | |
| 6,879,825 B1 | 4/2005 | Daly | |
| 6,888,536 B2 | 5/2005 | Westerman et al. | |
| 6,930,516 B2 | 8/2005 | Gabara | |
| 7,054,642 B1 | 5/2006 | Matz et al. | |
| 7,181,017 B1 | 2/2007 | Nagel et al. | |
| 7,187,997 B2 | 3/2007 | Johnson | |
| 7,225,337 B2 | 5/2007 | Baessler | |
| 7,334,720 B2 * | 2/2008 | Hulst ................... | G06F 21/10 235/380 |
| 7,340,276 B2 | 3/2008 | Irisawa | |
| 7,551,933 B2 | 6/2009 | Michaels et al. | |
| 7,653,037 B2 | 1/2010 | Prakash et al. | |
| 7,712,126 B2 | 5/2010 | Andersson et al. | |
| 7,797,552 B2 | 9/2010 | Kahn et al. | |
| 8,082,353 B2 | 12/2011 | Huber et al. | |
| 8,146,141 B1 | 3/2012 | Grandcolas et al. | |
| 8,555,067 B2 | 10/2013 | Schell et al. | |
| 8,966,262 B2 | 2/2015 | Schell et al. | |
| 9,344,832 B2 | 5/2016 | Schell et al. | |
| 2001/0039583 A1 | 11/2001 | Nobakht et al. | |
| 2002/0053735 A1 | 5/2002 | Neuhaus et al. | |
| 2002/0082048 A1 | 6/2002 | Toyoshima | |
| 2002/0085530 A1 | 7/2002 | Toyoshima | |
| 2002/0091931 A1 | 7/2002 | Quick, Jr. et al. | |
| 2002/0166048 A1 | 11/2002 | Coulier | |
| 2002/0197992 A1 | 12/2002 | Nizri et al. | |
| 2003/0083068 A1 | 5/2003 | Wong | |
| 2003/0119515 A1 | 6/2003 | Holler et al. | |
| 2003/0139180 A1 | 7/2003 | McIntosh et al. | |
| 2003/0172090 A1 | 9/2003 | Asunmaa et al. | |
| 2004/0068571 A1 | 4/2004 | Ahmavaara | |
| 2004/0102183 A1 | 5/2004 | Haub et al. | |
| 2004/0121802 A1 | 6/2004 | Kim et al. | |
| 2004/0142725 A1 | 7/2004 | Kim | |
| 2004/0176133 A1 | 9/2004 | Lipsit | |
| 2004/0204089 A1 | 10/2004 | Castrogiovanni et al. | |
| 2004/0215711 A1 | 10/2004 | Martin, Jr. et al. | |
| 2004/0233893 A1 | 11/2004 | Zhou et al. | |
| 2004/0235458 A1 | 11/2004 | Walden et al. | |
| 2004/0242224 A1 | 12/2004 | Janik et al. | |
| 2004/0248550 A1 | 12/2004 | Hausner et al. | |
| 2005/0009502 A1 | 1/2005 | Little et al. | |
| 2005/0054338 A1 | 3/2005 | Hosokawa | |
| 2005/0079863 A1 | 4/2005 | Macaluso | |
| 2005/0120209 A1 | 6/2005 | Kwon et al. | |
| 2005/0141438 A1 | 6/2005 | Quetglas et al. | |
| 2005/0176465 A1 | 8/2005 | Fornell | |
| 2005/0177733 A1 | 8/2005 | Stadelmann et al. | |
| 2005/0282584 A1 | 12/2005 | Faisy | |
| 2006/0046717 A1 | 3/2006 | Bovell et al. | |
| 2006/0059341 A1 | 3/2006 | Dharmadhikari et al. | |
| 2006/0072762 A1 | 4/2006 | Buer | |
| 2006/0077924 A1 | 4/2006 | Rune | |
| 2006/0079284 A1 | 4/2006 | Lu et al. | |
| 2006/0143098 A1 | 6/2006 | Lazaridis | |
| 2006/0154647 A1 | 7/2006 | Choi | |
| 2006/0172772 A1 | 8/2006 | Bjorkner | |
| 2006/0288407 A1 | 12/2006 | Naslund et al. | |
| 2007/0004386 A1 | 1/2007 | Singh et al. | |
| 2007/0036110 A1 | 2/2007 | Preguica | |
| 2007/0082655 A1 | 4/2007 | Link et al. | |
| 2007/0149170 A1 | 6/2007 | Bloebaum et al. | |
| 2007/0167161 A1 | 7/2007 | Cheng et al. | |
| 2007/0174618 A1 | 7/2007 | Nakano et al. | |
| 2007/0177562 A1 | 8/2007 | Castrogiovanni et al. | |
| 2007/0260811 A1 | 11/2007 | Merry et al. | |
| 2008/0003980 A1 | 1/2008 | Voss et al. | |
| 2008/0026149 A1 | 1/2008 | Tomasini et al. | |
| 2008/0051062 A1 | 2/2008 | Lee | |
| 2008/0104706 A1 | 5/2008 | Karp et al. | |
| 2008/0132205 A1 | 6/2008 | Svensson | |
| 2008/0148414 A1 | 6/2008 | Tom | |
| 2008/0166993 A1 | 7/2008 | Gautier et al. | |
| 2008/0167027 A1 | 7/2008 | Gautier et al. | |
| 2008/0167036 A1 | 7/2008 | Bush et al. | |
| 2008/0242285 A1 | 10/2008 | Riffe et al. | |
| 2008/0243683 A1 | 10/2008 | Patel et al. | |
| 2008/0244685 A1 | 10/2008 | Andersson et al. | |
| 2008/0251587 A1 | 10/2008 | Martinent et al. | |
| 2008/0253564 A1 | 10/2008 | Kahn et al. | |
| 2008/0260149 A1 | 10/2008 | Gehrmann | |
| 2008/0268813 A1 | 10/2008 | Maes | |
| 2008/0268815 A1 | 10/2008 | Jazra et al. | |
| 2008/0268866 A1 | 10/2008 | Sukkarie | |
| 2008/0270307 A1 | 10/2008 | Olson et al. | |
| 2008/0279005 A1 | 11/2008 | France | |
| 2008/0318550 A1 | 12/2008 | DeAtley | |
| 2009/0029738 A1 | 1/2009 | Kim et al. | |
| 2009/0061840 A1 | 3/2009 | Fleischman et al. | |
| 2009/0061934 A1 | 3/2009 | Hauck et al. | |
| 2009/0070861 A1 | 3/2009 | Jain | |
| 2009/0077643 A1 | 3/2009 | Schmidt et al. | |
| 2009/0100215 A1 | 4/2009 | Nochimowski | |
| 2009/0158032 A1 | 6/2009 | Costa et al. | |
| 2009/0163175 A1 | 6/2009 | Shi et al. | |
| 2009/0172419 A1 | 7/2009 | Takayama | |
| 2009/0181662 A1 | 7/2009 | Fleischman et al. | |
| 2009/0191857 A1 | 7/2009 | Horn et al. | |
| 2009/0198869 A1 | 8/2009 | Mosek | |
| 2009/0205028 A1 | 8/2009 | Smeets et al. | |
| 2009/0210923 A1 | 8/2009 | Jogand-Coulomb | |
| 2009/0239503 A1 | 9/2009 | Smeets | |

(56) References Cited

U.S. PATENT DOCUMENTS

| | | |
|---|---|---|
| 2010/0017861 A1 | 1/2010 | Krishnaswamy et al. |
| 2010/0062808 A1 | 3/2010 | Cha et al. |
| 2010/0064361 A1 | 3/2010 | Shewchuk et al. |
| 2010/0090805 A1 | 4/2010 | Libotte |
| 2010/0122324 A1 | 5/2010 | Welingkar et al. |
| 2010/0161966 A1 | 6/2010 | Kwon et al. |
| 2010/0181380 A1 | 7/2010 | Trotter |
| 2010/0210304 A1 | 8/2010 | Huslak |
| 2010/0242100 A1 | 9/2010 | Korhonen |
| 2010/0262829 A1 | 10/2010 | Brown et al. |
| 2010/0306107 A1 | 12/2010 | Nahari |
| 2010/0311468 A1 | 12/2010 | Shi et al. |
| 2011/0003590 A1 | 1/2011 | Yoon et al. |
| 2011/0028135 A1 | 2/2011 | Srinivasan |
| 2011/0059773 A1 | 3/2011 | Neumann et al. |
| 2011/0092185 A1 | 4/2011 | Garskof |
| 2011/0093339 A1 | 4/2011 | Morton |
| 2011/0151836 A1 | 6/2011 | Dadu et al. |
| 2011/0194553 A1 | 8/2011 | Sahin et al. |
| 2011/0242355 A1 | 10/2011 | Goma et al. |
| 2011/0269423 A1 | 11/2011 | Schell et al. |
| 2011/0306318 A1 | 12/2011 | Rodgers et al. |
| 2012/0047227 A1 | 2/2012 | Haggerty et al. |
| 2012/0108204 A1 | 5/2012 | Schell et al. |
| 2012/0108205 A1 | 5/2012 | Schell et al. |
| 2012/0108206 A1 | 5/2012 | Haggerty |
| 2012/0108207 A1 | 5/2012 | Schell et al. |
| 2012/0108295 A1 | 5/2012 | Schell et al. |
| 2012/0115441 A1 | 5/2012 | Schell |
| 2012/0117635 A1 | 5/2012 | Schell et al. |
| 2012/0135710 A1 | 5/2012 | Schell et al. |
| 2012/0309355 A1 | 12/2012 | Pudney et al. |

FOREIGN PATENT DOCUMENTS

| | | |
|---|---|---|
| DE | 10215861 A1 | 8/2003 |
| EP | 367361 A2 | 5/1990 |
| EP | 1276339 A1 | 1/2003 |
| EP | 1361527 A1 | 11/2003 |
| EP | 1679925 A1 | 7/2006 |
| EP | 1748661 A1 | 1/2007 |
| EP | 1865437 A2 | 12/2007 |
| EP | 1870814 A1 | 12/2007 |
| EP | 2076071 A1 | 7/2009 |
| EP | 2079256 A1 | 7/2009 |
| EP | 2373074 A1 | 10/2011 |
| EP | 2410777 A1 | 1/2012 |
| EP | 2448215 A1 | 5/2012 |
| EP | 2448216 A1 | 5/2012 |
| EP | 2509342 A2 | 10/2012 |
| EP | 2509352 A2 | 10/2012 |
| GB | 2428544 A | 1/2007 |
| JP | 2002271261 A | 9/2002 |
| JP | 2006119727 A | 5/2006 |
| JP | 2006304344 A | 11/2006 |
| JP | 2008527510 A | 7/2008 |
| WO | WO9742783 A2 | 11/1997 |
| WO | WO0115414 A1 | 3/2001 |
| WO | WO0219664 A2 | 3/2002 |
| WO | WO02058361 A2 | 7/2002 |
| WO | WO03041443 A1 | 5/2003 |
| WO | WO03077585 A1 | 9/2003 |
| WO | WO03079628 A1 | 9/2003 |
| WO | WO2004057485 A1 | 7/2004 |
| WO | WO2004082310 A1 | 9/2004 |
| WO | WO2004105421 A2 | 12/2004 |
| WO | WO2006054980 A1 | 5/2006 |
| WO | 2006072410 A1 | 7/2006 |
| WO | WO2006084183 A1 | 8/2006 |
| WO | WO2007079425 A2 | 7/2007 |
| WO | WO2008086255 A2 | 7/2008 |
| WO | WO2009002649 A2 | 12/2008 |
| WO | WO2009032853 A1 | 3/2009 |
| WO | WO2009092115 A2 | 7/2009 |
| WO | WO2009141764 A2 | 11/2009 |
| WO | WO2010102236 A2 | 9/2010 |
| WO | WO2010123890 A1 | 10/2010 |

OTHER PUBLICATIONS

EP 1-361527 A1 "Method for loading an application in a device and smart acrd thereafter" (Andersson: Dec. 11, 2003).*

3rd Generation Partnership Project; Technical Specification Group Services and System Aspects; Feasibility Study on Remote Management of USIM Application on M2M Equipment; (Release 8); 3GPP TR 33.812 V0.3.0 (May 2008), pp. 1-61.

"TCG MPWG Mobile Reference Architecture. Specification version 1.0 Revision 1", TCG, Jun. 12, 2007, pp. 1-87, XP002516393, Retrieved from the internet: URL: https://www.trustedcomputing-group.org/specs/mobilephone/tcg-mobile-reference-architecture-1.0.pdf [retrieved on Feb. 23, 2009].

3GPP TS 35.205 V9.0.0, "Specification of the MILENAGE Algorithm Set: An example algorithm set for the 3GPP authentication and key generation functions f1 f1*, f2, f3, f4, f5 and f5*", Dec. 31, 2009.

Authorized officer Beate Giffo-Schmitt, International Preliminary Report on Patentability in PCT/2009/31016 dated Jul. 29, 2010, 10 pages.

Clark. "Apple Patents 'SIM within' secure element technology." In: Near Field Communications World [online]. Dated Nov. 9, 2011. Retrieved on Jul. 13, 2012 from the Internet at UEL:<http://www.nfcworld.com/2011/11/09/311213/apple-patents-sim-within-secure-element-technology/>.

De Atley, et al., Service Provider Activation, U.S. Appl. No. 11/849,286, filed Sep. 1, 2007.

European Extended Search Report, dated May 5, 2008, issued in European Application No. 08250050.5.

European Search Report, dated Apr. 24, 2008, issued in European Application No. 08250053.

International Preliminary Report on Patentability, dated Dec. 22, 2009, issued in International Application No. PCT/US2008/064971.

International Preliminary Report on Patentability, dated Jul. 16, 2009, issued in International Application No. PCT/US2008/05340.

International Preliminary Report on Patentability, dated Jul. 7, 2009, issued in International Application No. PCT/US2008/050343.

International Search Report and Written Opinion of the International Searching Authority, PCT Application Serial No. PCT/US2009/031016, dated May 27, 2009, 14 pp.

International Search Report and Written Opinion of the International Searching Authority, PCT Application Serial No. PCT/US2008/075138, dated Feb. 6, 2009, 16 pp.

International Search Report and Written Opinion, dated Apr. 24, 2008, issued in International Application No. PCT/US2008050340.

International Search Report and Written Opinion, dated Jan. 5, 2009, issued in International Application No. PCT/US2008/050343.

Invitation to Pay Fees and Partial International Search Report, dated Oct. 22, 2008, issued in International Application No. PCT/US2008/064971.

Kasper, Michael et al. "Subscriber Authentication in Cellular Networks with Trusted Virtual SIMs", Advanced Communication Technology, 2008. ICACT 2008. 10.sup.th International Conference on, IEEE, Piscataway, NJ, USA, Feb. 17, 2008, pp. 903-908, XP031245274, ISBN: 978-89-5519-136-3.

Oma; Open Mobile Alliance: "OMA DRM Specification Candidate Version 2.2", Apr. 19, 2011, 1 XP55041315, Retrieved from the Internet: URL:http://WWN.openmobilealliance.org!Technical/release_program/docs/DRMN2_2-2011_0419-C/OMA-TS-DRM_DRM-V2_2-2011_0419-C.pdf.

PCT, "International Search Report and Written Opinion", PCT/US2008/009009, (dated Nov. 17, 2008), whole document.

PCT, "International Search Report and Written Opinion", PCT/US2008/009007, (dated Nov. 18, 2008), whole document.

KR 10-2011-111627. Office Action dated Jun. 26, 2013.

Chinese Application for Invention No. 201110462177.X—First Office Action dated Dec. 20, 2013.

(56) References Cited

OTHER PUBLICATIONS

Japanese Patent Application No. 2011-251074—Office Action dated Dec. 11, 2013.
"3rd Generation Partnership Project; Technical Specification Group Services and System Aspects; Feasibility study on the security of remote provisioning and change of subscription for Machine for Machine (M2M) equipment (Release 9)", 3GPP TR 33.812, V9.2.0 (Jun. 2010), pp. 1-88.
European Patent Application No. 11187094.5—Office Action dated Mar. 21, 2014.
Taiwanese Patent Application No. 100139136—Office Action dated Apr. 24, 2014.
Authorized officer Athina Nickitas-Etienne, International Preliminary Report on Patentability in PCT/US2008/75138 dated Mar. 18, 2010, 10 pages.
Japanese Patent Application No. 2016-081966—Office Action dated Feb. 6, 2017.
Indian Patent Application No. 3697/CHE/2011—First Examination Report (FER) dated Nov. 15, 2017.

* cited by examiner

METHODS AND APPARATUS FOR DELIVERING ELECTRONIC IDENTIFICATION COMPONENTS OVER A WIRELESS NETWORK

CROSS-REFERENCE TO RELATED APPLICATIONS

This application is a continuation of U.S. patent application Ser. No. 14/629,386, entitled "METHODS AND APPARATUS FOR DELIVERING ELECTRONIC IDENTIFICATION COMPONENTS OVER A WIRELESS NETWORK" filed Feb. 23, 2015, which is a continuation of U.S. patent application Ser. No. 14/049,185, entitled "METHODS AND APPARATUS FOR DELIVERING ELECTRONIC IDENTIFICATION COMPONENTS OVER A WIRELESS NETWORK" filed Oct. 8, 2013, now U.S. Pat. No. 8,966,262, issued on Feb. 24, 2015, which is a continuation of U.S. patent application Ser. No. 13/111,801, entitled "METHODS AND APPARATUS FOR DELIVERING ELECTRONIC IDENTIFICATION COMPONENTS OVER A WIRELESS NETWORK" filed May 19, 2011, now U.S. Pat. No. 8,555,067, issued on Oct. 8, 2013, which claims the benefit of U.S. Provisional Patent Application No. 61/407,862, entitled "METHODS AND APPARATUS FOR DELIVERING ELECTRONIC IDENTIFICATION COMPONENTS OVER A WIRELESS NETWORK" filed on Oct. 28, 2010, each of which is incorporated herein by reference in its entirety for all purposes.

FIELD

The present invention relates generally wireless systems such as for example systems in which devices communicate using cellular networks. More particularly, in one exemplary aspect, the present invention is directed to methods and apparatus for delivering electronic identification components to a cellular device, over a cellular network.

BACKGROUND

Access control is required for secure communication in most prior art wireless radio communication systems. As an example, one simple access control scheme might include: (i) verifying the identity of a communicating party, and (ii) granting a level of access commensurate with the verified identity. Within the context of an exemplary cellular system, access control is governed by an access control client, referred to as a Subscriber Identity Module (SIM) which is physically embodied within a physical card form factor Universal Integrated Circuit Card (UICC). During operation, the SIM card authenticates the subscriber to the cellular network. After successful authentication, the subscriber is allowed access to the cellular network.

Each SIM card is associated with a single user account, where the user account data is permanently stored on the SIM card. If a user wishes to change services from an existing account to a new account, the user needs to replace the existing SIM card with a new SIM card (e.g., by physically removing the existing SIM card from the SIM card slot, and inserting the new SIM card). In short, the user account is tied to the SIM card and not the mobile device itself. Consequently, adding additional accounts requires using a new SIM card. For example, when a subscriber travels to a new service area, the subscriber must often choose between paying high roaming fees, or purchasing a new SIM card. Similarly, for users that change between billing accounts (e.g., sharing a phone for work and personal use, etc.), the user must constantly switch between SIM cards. Some devices have attempted to address this issue by providing multiple card receptacles, so as to enable multiple SIM cards. However, these "multi-card" solutions are undesirable, as additional SIM card receptacles take significant area, and do not address the root inflexibility of SIM card accounts.

Moreover, existing SIM solutions consist of one or more SIM software identities that are "hardcoded" to a physical UICC card media; i.e., the SIM card assembly cannot be re-programmed, etc. For all practical intents and purposes, prior art SIM cards are indivisible; that is, the SIM software is inseparable from the physical UICC card media. Consequently, certain operations cannot be performed within the existing SIM card framework. For example, a SIM cannot be moved between SIM cards, modified, revoked, and/or enabled for different network carriers. Consequently, as described in greater detail subsequently herein, existing SIM card solutions have become increasingly inadequate for the evolving complexities of cellular technologies (and other wireless technologies).

Thus, improved solutions are required for providing users with the ability to obtain (e.g., purchase) and manage user accounts. Such improved solutions should ideally support delivery of a new or different user account to previously deployed or purchased devices, without also requiring a new SIM card.

SUMMARY

The present invention satisfies the aforementioned needs by providing, inter alia, improved apparatus and methods for secure acquisition and delivery of access control clients.

In a first aspect of the invention, a method of receiving an access control client over a wireless network is disclosed. In one embodiment, the method includes: establishing an authorized data session, wherein the authorized data session has a first set of access rights; selecting an access control client, the access control client having a second set of access rights; receiving one or more update packages; assembling the one or more update packages into the access control client; and executing the access control client.

In a second aspect of the invention, a method for modifying a device operating system over a wireless network is disclosed. In one embodiment, the method includes establishing an authorized data session, wherein the authorized data session has a first set of access rights; receiving one or more update packages; assembling the one or more update packages into an operating system component; and wherein the operating system component is configured for operation with an access control client, the access control client having a second set of access rights.

In a third aspect of the invention, a method for receiving an access control client over a network is disclosed. In one embodiment, the method includes: establishing an authorized data session, wherein the authorized data session has a first set of access rights enabling access to one or more packages associated with an access control client; downloading the one or more packages associated with the access control client, wherein the access control client has a second set of access rights; assembling the access control client based at least in part on the downloaded one or more packages; and establishing a subscriber session with the assembled access control client.

In one variant, the authorized data session includes a mutual verification between the wireless network and a recipient device. For example, the mutual verification may include a cryptographic key protocol. In one such instance, the cryptographic key protocol is based on one or more asymmetric Rivest Shamir and Adelman (RSA) public and private keys.

In other variations, the second set of access rights enables one or more customer services such as for example: placing or receiving a voice call, accessing a network, accessing a media file. Alternately, the first set of access rights is not enabled for customer services.

In a fourth aspect of the invention, a method of modifying a device operating system over a network is disclosed. In one embodiment, the method includes: establishing an authorized data session having a first set of access rights; receiving an update request via the authorized data session, and responsively generating an appropriate update package; and transmitting one or more update packages via the authorized data session. The one or more update packages are configured for operation with an access control client, the access control client having a second set of access rights.

In one variant, the network is a wireless network, and the authorized data session includes a mutual verification between the wireless network and the device.

In a second variant, the first set of access rights is substantially limited to exchanging update packages. Alternatively, in other variants, the second set of access rights enables one or more subscriber sessions. As another alternative, the first set of access rights is a subset of the second set of access rights. In still a further alternative, the second set of access rights is selected based on one or more user selections. Moreover, the update request may include the one or more user selections. One or more update options may also be presented to the device.

In another aspect of the invention, a wireless apparatus is disclosed. In one embodiment, the wireless apparatus includes: one or more wireless interfaces adapted to connect to one or more wireless networks; a secure element adapted to store a plurality of user access data elements, each user access data element being associated with a corresponding network; a processor; and a storage device in data communication with the processor, the storage device including computer-executable instructions.

In one variant, the computer-executable instructions are configured to, when executed by the processor: establish an authorized data session limited to a first set of access rights; request an update for an access control client via the authorized data session; and establish a subscriber session with the updated access control client, wherein the subscriber session has a second set of access rights.

In a second variant, the wireless device is a mobile device, and the access control client is an electronic Subscriber Identity Module (eSIM).

In yet another aspect of the invention, a network apparatus is disclosed. In one embodiment, the network apparatus includes: one or more interfaces adapted to communicate with one or more wireless devices; a processor; and a storage device in data communication with the processor, the storage device including computer-executable instructions. In one variant, the computer-executable instructions are configured to, when executed by the processor: establish an authorized data session with one of the one or more wireless devices, the authorized data session having a first set of access rights; receive an update request from the one wireless device and responsively generate an appropriate update package; transmit the generated update package. The generated update package is configured for operation with an access control client, the access control client having a second set of access rights.

In yet another aspect of the invention, a computer readable apparatus is disclosed. In one embodiment, the apparatus comprises a storage medium configured to store at least one computer program. In one variant, the program includes instructions which, when executed: establish an authorized data session having a first set of access rights; receive one or more update packages; and assemble the one or more update packages into an operating system component.

Other features and advantages of the present invention will immediately be recognized by persons of ordinary skill in the art with reference to the attached drawings and detailed description of exemplary embodiments as given below.

DETAILED DESCRIPTION

Figure 1:
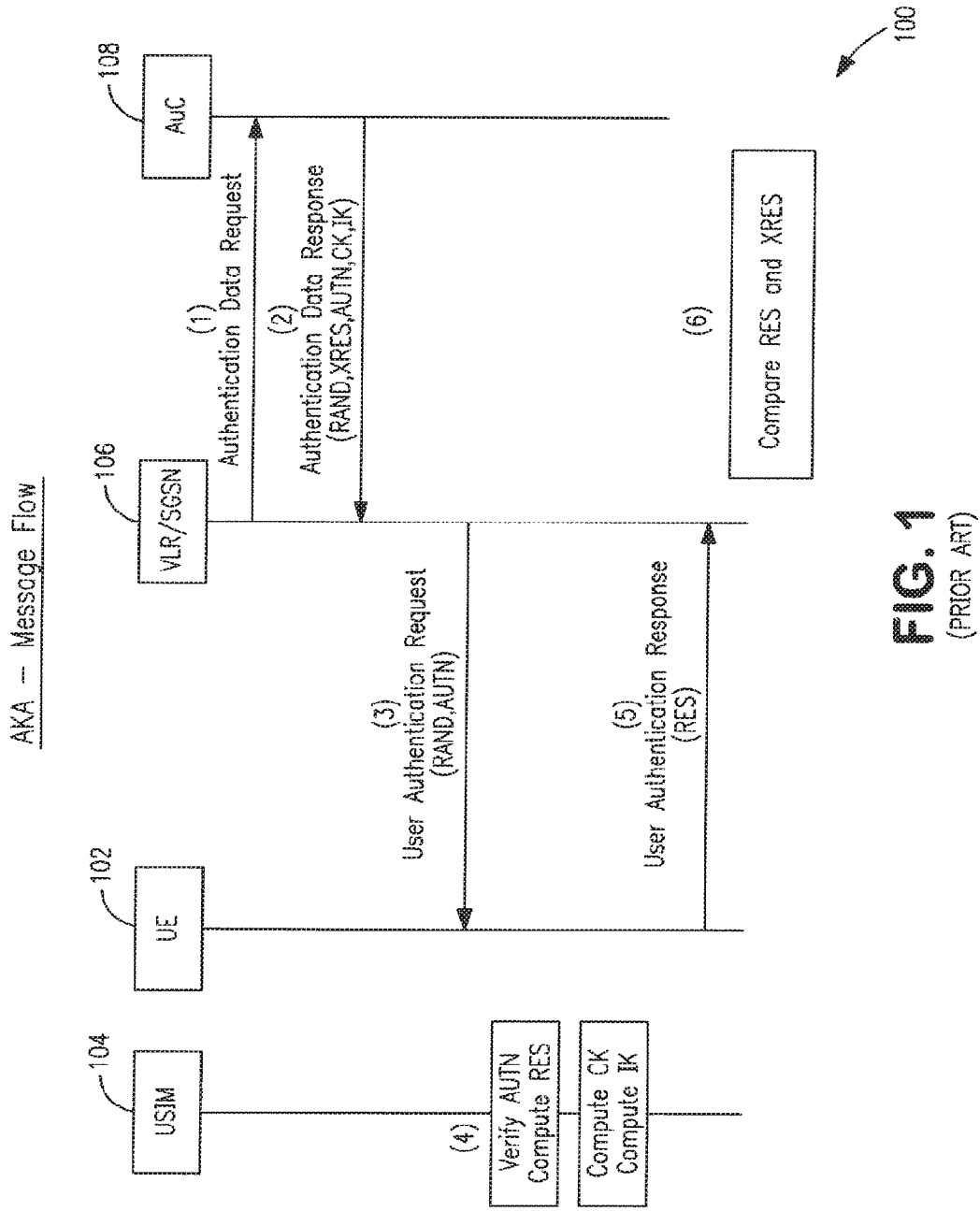
FIG. 1 is a logical ladder diagram illustrating prior art Authentication and Key Agreement (AKA) procedure using a Subscriber Identity Module (SIM).

Reference is now made to the drawings, wherein like numerals refer to like parts throughout.

In one aspect, the present invention provides methods and apparatus for delivering an access control client to a device, over a network. In one exemplary embodiment, a cellular network can securely deliver an eSIM to a cellular device after the cellular device is deployed. In particular, the cellular device is pre-programmed with limited capabilities for connecting to the network. The cellular device has some limited access capabilities to connect to an update portal, but must receive a fully featured eSIM to make voice calls, receive and transmit user data, etc. For example, a user purchases a mobile device (e.g., a cellular phone) with a simple access module. The access module is configured to connect to the cellular network, authenticate the device, and enable the user to purchase or retrieve a full featured eSIM. The cellular network securely delivers the eSIM that is assembled and activated by the bootstrap OS.

As described in greater detail herein, one exemplary embodiment of the present invention discloses an access module system that can facilitate delivery of components associated with an access control client (including for example, the operating system, and access control client components). After receiving properly delivered packages that have been correctly signed and/or encrypted, the operating system can assemble and load the components. In various incarnations of the present invention, the packages can be used to deliver operating systems, access control clients, user account data, etc.

In one aspect, the present invention also contemplates software based updates for managing the entire life cycle of the wireless device. Accordingly, the flexibility allotted to the presented methodologies include capabilities for replacement of any software element of the wireless device, including even the access module, and/or operating system components. For example, a cellular device can receive an entirely new operating system to update its authentication algorithm.

Various other useful applications for the disclosed invention include evolving security capabilities, updating revision control, post deployment provisioning of new features and services.

Exemplary embodiments and aspects of the present invention are now described in detail. While these embodiments and aspects are primarily discussed in the context of Subscriber Identity Modules (SIMs) of a GSM, GPRS/EDGE, or UMTS cellular network, it will be recognized by those of ordinary skill that the present invention is not so limited. In fact, the various aspects of the invention are useful in any wireless network (whether cellular or otherwise) that can benefit from the secure modification, storage and execution of access control entities or clients.

It will also be recognized that while the term "subscriber identity module" (SIM) is used herein (e.g., eSIM), this term in no way necessarily connotes or requires either (i) use by a subscriber per se (i.e., the invention may be practiced by a subscriber or non-subscriber); (ii) identity of a single individual (i.e., the invention may be practiced on behalf of a group of individuals such as a family, or intangible or fictitious entity such as an enterprise); or (iii) any tangible "module" equipment or hardware.

Within the context of prior art UMTS cellular networks, a user equipment (UE) includes a mobile device and a Universal Subscriber Identity Module (USIM). The USIM is a logical software entity that is stored and executed from a physical Universal Integrated Circuit Card (UICC). A variety of information is stored in the USIM such as subscriber information, as well as the keys and algorithms used for authentication with the network operator in order to obtain wireless network services.

Generally, UICCs are programmed with a USIM prior to subscriber distribution; the pre-programming or "personalization" is specific to each network operator. For example, before deployment, the USIM is associated with an International Mobile Subscriber Identify (IMSI), a unique Integrated Circuit Card Identifier (ICC-ID) and a specific authentication key (K). The network operator stores the association in a registry contained within the network's Authentication Center (AuC). After personalization the UICC can be distributed to subscribers.

Referring now to FIG. 1, one exemplary Authentication and Key Agreement (AKA) procedure 100 using the aforementioned prior art USIM is illustrated in detail. During normal authentication procedures, the UE 102 acquires the International Mobile Subscriber Identifier (IMSI) from the USIM 104. The UE passes it to the Serving Network (SN) 106 of the network operator or the visited core network. The SN forwards the authentication request to the AuC 108 of the Home Network (HN). The HN compares the received IMSI with the AuC's registry and obtains the appropriate K. The HN generates a random number (RAND) and signs it with K using an algorithm to create the expected response (XRES). The HN further generates a Cipher Key (CK) and an Integrity Key (IK) for use in cipher and integrity protection as well as an Authentication Token (AUTN) using various algorithms. The HN sends an authentication vector, consisting of the RAND, XRES, CK, and AUTN to the SN. The SN stores the authentication vector only for use in a one-time authentication process. The SN passes the RAND and AUTN to the UE.

Once the UE 102 receives the RAND and AUTN, the USIM 104 verifies if the received AUTN is valid. If so, the UE uses the received RAND to compute its own response (RES) using the stored K and the same algorithm that generated the XRES. The UE passes the RES back to the SN. The SN 106 compares the XRES to the received RES and if they match, the SN authorizes the UE to use the operator's wireless network services.

In the context of the exemplary embodiment of the present invention, instead of using a physical UICC as in the prior art, the UICC is emulated as a virtual or electronic entity such as e.g., a software application, hereafter referred to as an Electronic Universal Integrated Circuit Card (eUICC), that is contained within a secure element (e.g., secure microprocessor or storage device) in the UE. The eUICC is capable of storing and managing multiple USIM elements, referred hereafter as Electronic Subscriber Identity Modules (eSIM). Each eSIM contains the same data of a typical USIM. The eUICC selects an eSIM based upon the eSIM's ICC-ID. Once the eUICC selects the desired eSIM (s), the UE can initiate an authentication procedure to obtain wireless network services from the eSIM's corresponding network operator.

Figure 2:
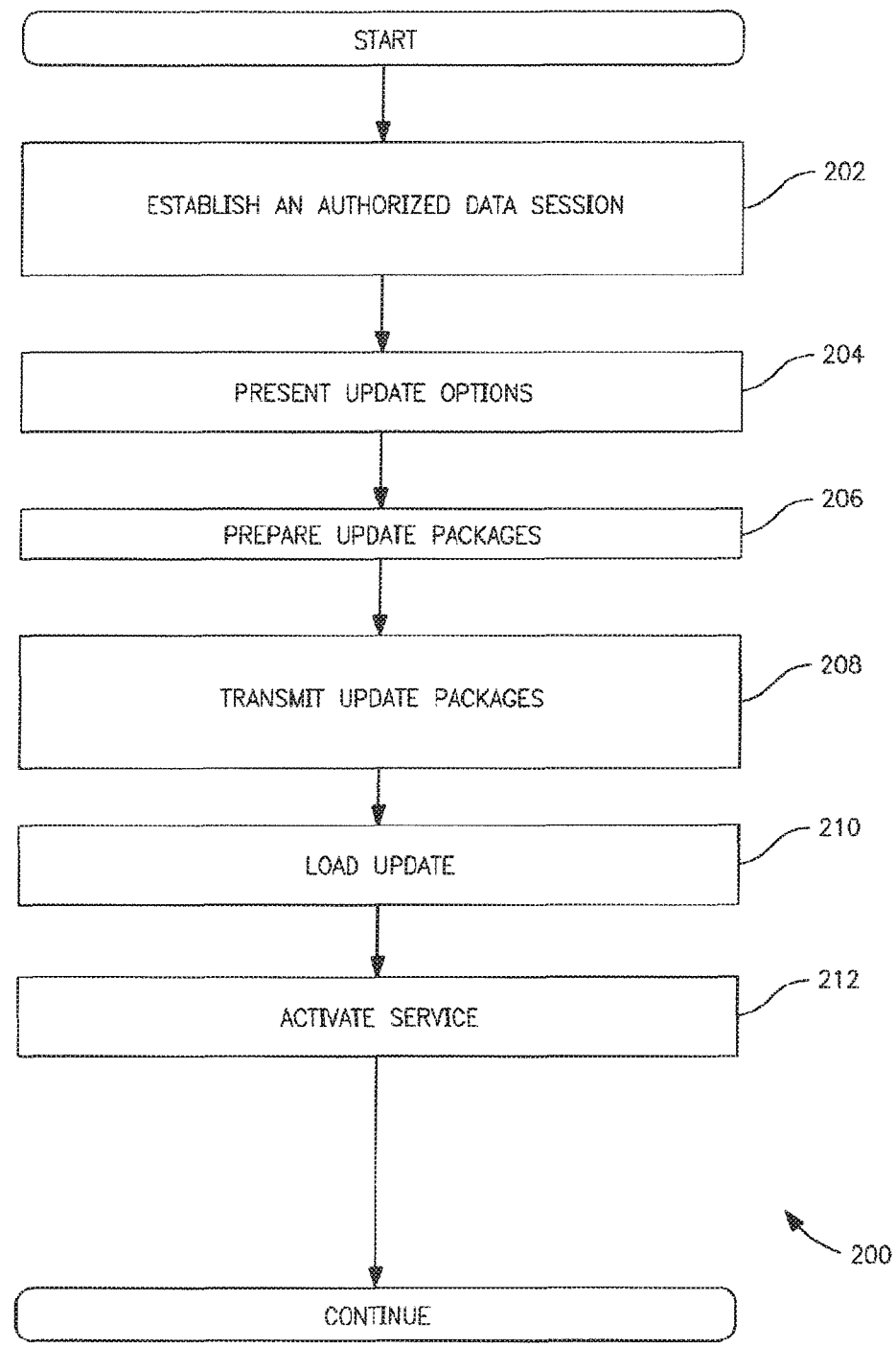
FIG. 2 is a logical flow diagram detailing one exemplary embodiment for programming a mobile device eSIM, in accordance with various aspects of the present invention.

FIG. 2 is a process diagram of one exemplary embodiment 200 of secure delivery of eSIM data according to the invention. A user purchases a wireless device from an authorized retail entity for a local carrier, the eUICC of the wireless device is pre-loaded with an access module. See, e.g., co-owned and co-pending U.S. patent application Ser. No. 13/080,521 filed on Apr. 5, 2011 and entitled "METHODS AND APPARATUS FOR STORAGE AND EXECUTION OF ACCESS CONTROL CLIENTS", previously incorporated by reference herein, which describes exemplary apparatus and methods for establishing trusted communications.

The limited functionality of the access module is configured to establish data connections with a predefined data portal of the local carrier network, download software packages from the update portal, and assemble the received packages. These packages may include, in whole or in part, operating system components, access control clients, user account data, etc. In the following example, the user downloads a new eSIM to their device electronically, thereby obviating any physical component possession requirements. The eSIM authenticates the user, and thereafter the network grants access to the user; network access allows end-user operations such as: making/receiving of cellular calls, browsing the Internet, accessing audio visual content over the network, etc.

At step 202 of the method 200, the wireless device establishes an authorized data session between the eUICC secure element of the mobile device and the local carrier update portal. The session authorization is based on eUICC module identification data. The eUICC module identification data references a pre-existing key specific to the eUICC, although numerous other approaches recognized by those of ordinary skill when given the present disclosure may be used as well. As described in greater detail herein, the eUICC includes an access module that has in one variant been "burned" or hardcoded with a public/private key and certificate by an authenticating authority (e.g., the Assignee hereof). The public key and an endorsement certificate are provided to the local carrier update portal. The local carrier update portal verifies the endorsement certificate (e.g., verification with the authenticating authority that issued the certificate, etc.). If the endorsement certificate is valid, the local carrier update portal transmits a vendor certificate, and a session key to the mobile device, where the vendor certificate and session key are further encrypted by the mobile device's public key. Responsively, the eUICC decrypts the vendor certificate with the vendor's public key, and verifies its authenticity. It should be noted that successful decryption of the vendor's certificate with the vendor's public signature key provides the eUICC with proof that the signature is not falsified. The mobile device decrypts the vendor certificate and session key with its private key. If the vendor certificate is valid, then the mobile device accepts the session key.

Successful completion of the foregoing exchange ensures that both mobile device and the local carrier update portal are legitimate, and now have a shared session key. The shared session key is used to conduct a secure session between the mobile device and the local carrier update portal.

Referring back to FIG. 2, at step 204, the user (or device administrative entity) is presented with one or more update options. The various options may include for example, a listing of available data plans, available network carrier options, etc. Upon receiving the user selection at step 206, one or more packages are prepared by the local carrier update portal. At step 208, the packages are transmitted to the mobile device, each package encrypted with the session key.

The one or more packages may for example, include an eSIM. Other common packages may include additional features or components necessary for the SIM OS, or "common OS". In particular, while the access module is sufficient to establish a secured session with the local carrier update portal, it does not offer other elements necessary for SIM operation. For example, the common OS provides services such as file input and output, file management, memory allocation, etc. The common OS in combination with the eUICC software emulates services which are traditionally implemented by a prior art UICC to support SIM operation.

At step 210, after receiving the securely delivered packages, the bootstrap OS can load and assemble the packages. Once assembled, the bootstrap OS executes the common OS, and the common OS loads and executes the appropriate eSIM. It should be noted that the common OS may have either been delivered via package, or resided within the eUICC, Moreover, it should also be noted that different eSIMs may also require different common OS services. The bootstrap OS should ensure that the eSIM and common OS are compatible. Compatibility can be verified with version identifiers, trusted entity certifications, etc. For example, the bootstrap OS may verify that an eSIM is acceptable for use with the existing common OS, and has been signed by a trusted entity.

Additional services are activated by e.g., the device prompting the user for new account information (e.g., user name, account number, password, and/or PIN) as required (step 212). Thereafter, the updated mobile device has activated a full featured eSIM to make voice calls, receive and transmit user data, etc. Alternatively, in non-cellular implementations, functions such as access point or gateway access (e.g., in a WLAN), broadband access, etc. can be enabled using the foregoing methodology.

Exemplary embodiments of the present invention for managing the entire life cycle of the wireless device are described. The presented programming methodologies support installing security updates, installing OS patches, and/or completely replacing the one or more aspects of the OS.

In one exemplary embodiment, the eUICC additionally includes a bootstrap OS and a common OS. The simple bootstrap OS loads and executes a common OS, and its associated eSIM, and patches. The operating system is required to support SIM operation, but is not directly related to user access control per se. In particular, the common OS provides generalized services such as file input and output, file management, memory allocation, etc. In extreme cases, a cellular or other device can receive and assemble an entirely new bootstrap OS to update its authentication algorithm.

Figure 3:
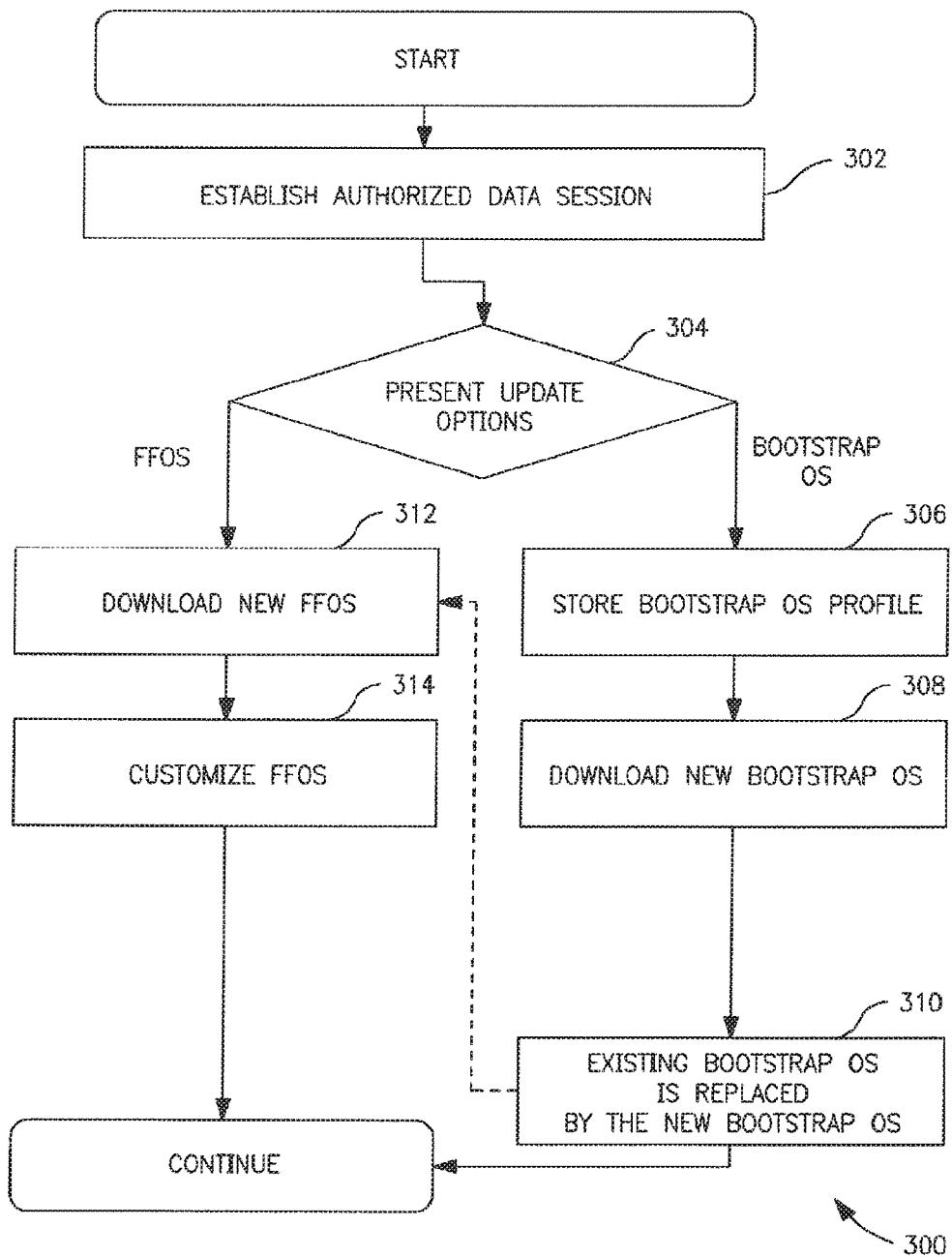
FIG. 3 is a logical flow diagram detailing one exemplary embodiment for programming a mobile device operating system, in accordance with various aspects of the present invention.

FIG. 3 illustrates an exemplary process 300 for replacing (or updating) the operating system according to an embodiment of the present invention. Common reasons for requiring a bootstrap OS update include: newly discovered security holes, improvements to authentication algorithms, new capabilities, etc. In some instances, in order to encourage timely security updates, carriers may opt to disable mobile devices that have not been updated within a reasonable time. Moreover, the carrier can take proactive action to encourage the user to update (e.g., repeated reminders with increasing frequency), or even configure the device such that upon notification, the update must be completed for continued service access. Forcible updates (i.e., those performed without user assent) are also contemplated by the invention in certain embodiments. Other reasons for replacing or updating the operating system may include for instance customer driven considerations e.g., moving to a new cellular network service, updating product capabilities, purchasing a new cellular contract, etc.

At step 302, the mobile device establishes an authorized data session between the secure element and the carrier update portal, via the pre-existing key specific to the eUICC.

In some circumstances, changes to the bootstrap OS will also require updating corresponding portions of the common OS, e.g., to enable new security functionality, etc. Accordingly, at step 304 of the illustrated embodiment, the mobile device may: (i) update only the bootstrap OS portion; (ii) update the common OS portion, or (iii) update the bootstrap OS and the common OS. For example, the mobile device may update its list of supported carriers by updating its bootstrap OS. Similarly, if the mobile device may update its internal file structure to support larger eSIM file structures with a common OS update. Yet further still, the mobile device may be reprogrammed to support a new carrier, which further includes changes to the file structure (both bootstrap OS and common OS are updated).

If the bootstrap OS is updated, then the local carrier update portal stores the bootstrap OS profile configuration of the mobile device (step 306). The bootstrap OS profile includes, but is not limited to, network authentication configuration, eSIM management, etc. This stored OS profile may be later used to configure the common OS update package (the common OS update may be specific to the configuration of the mobile device). An update package containing the bootstrap OS is subsequently downloaded onto the mobile device and assembled into a new bootstrap OS, at step 308. The existing bootstrap OS in the eUICC is replaced by the new bootstrap OS at step 310.

If the bootstrap OS does not require any corresponding changes to the existing common OS, then the device is ready to operate with the new bootstrap OS. If, on the other hand, the bootstrap OS update also requires updating at least portions of, the fully featured common OS then, the common OS update will proceed based at least in part on the updated OS profile stored at step 306.

Accordingly, the common OS can be downloaded per steps 312. Due to specific implementation requirements of the mobile device, eUICC, or the local carrier network, the common OS package, may be customized corresponding to the OS profile previously stored at step 306 (per step 314). The fully featured common OS is downloaded onto the mobile device and assembled into a new common OS.

In some cases, multiple common OSs may be stored within the mobile device e.g., so as to support multiple eSIMs, etc. The bootstrap OS will control execution of eSIMs; and this can include selection of the appropriate common OS. In some embodiments, execution of the common OS and/or various components thereof may be made dependent upon compatibility (e.g., bootstrap OS to common OS, common OS component to common OS component, etc.)

Figure 4:
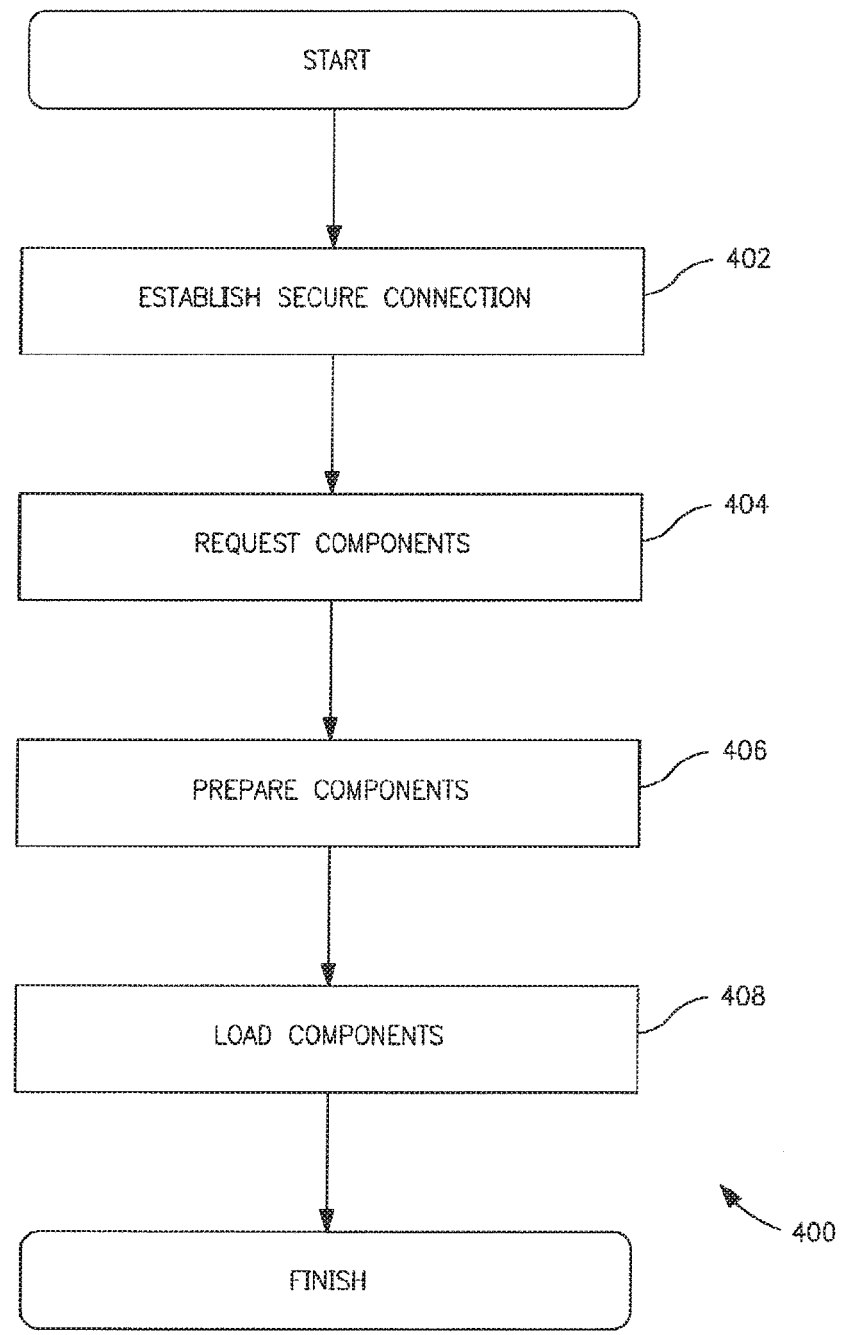
FIG. 4 is a logical flow diagram illustrating one embodiment of a generalized method for programming components of a mobile device according to the invention.

Referring now to FIG. 4, one embodiment of a generalized method 400 for delivering electronic identification components via a cellular network is shown. A mobile device with a pre-loaded limited function access module is distributed to the end user; e.g., by sale, promotion, as part of a subscription plan, etc. The limited functionality of the access module is configured to establish data connections with a local carrier network, download software packages from the carrier network, and assemble the received packages.

At step 402, the mobile device establishes a connection to an update portal on one or more acceptable carrier networks. The update portal could be e.g., a carrier data portal, a third party software vendor, a mobile device manufacturer, etc. Various types of network entities capable of providing electronic identification components are described within U.S. patent application Ser. No. 13/093,722 filed on Apr. 25, 2011 and entitled "APPARATUS AND METHODS FOR STORING ELECTRONIC SUBSCRIBER IDENTITY MODULES", Ser. No. 13/095,716 filed on Apr. 27, 2011 and entitled "SYSTEM FOR DISTRIBUTION OF UNIQUE SUBSCRIBER IDENTITY MODULES", and U.S. Provisional Patent Application Ser. Nos. 61/479,319 filed on Apr. 26, 2011 and entitled "ELECTRONIC ACCESS CLIENT DISTRIBUTION APPARATUS AND METHODS", and 61/483,582 filed on May 6, 2011 and entitled "METHODS AND APPARATUS FOR PROVIDING MANAGEMENT CAPABILITIES FOR ACCESS CONTROL CLIENTS", each of the foregoing being incorporated herein by reference in its entirety. For example, a eUICC appliance or eSIM depot are network structures that can establish secure connections to mobile devices to exchange or modify existing eSIMs.

In some embodiments, the pre-loaded limited functionality access module may be configured to scan for a plurality of preferred carriers. If multiple carriers are available, then the device determines the availability of one or more carrier networks, and selects from the list of available carriers. In one embodiment, the list of carriers is additionally prioritized into "preferred" carriers; preferred carriers are prioritized over other carriers due to e.g., business considerations, user preferences, etc. In some embodiments, the list of carriers is present to the user via a graphical user interface (GUI).

In some variants, a carrier couples the mobile device to a Trusted Service Manager (TSM) portal. The TSM is an entity that is authorized by the local carrier to deliver update packages to the mobile device.

In one exemplary embodiment, step 402 requires an authorized data session prior to the device having a functioning access control client. Specifically, step 402 is performed before the device has activated a valid eSIM. Reference is now made to one embodiment of a secure transfer scheme as described in co-owned, co-filed U.S. patent application Ser. No. 13/080,521 filed on Apr. 5, 2011 and entitled "METHODS AND APPARATUS FOR STORAGE AND EXECUTION OF ACCESS CONTROL CLIENTS", previously incorporated herein. Artisans of ordinary skill will appreciate that the following scheme may be substituted with other analogous schemes.

Accordingly, in the exemplary embodiment, the mobile device is hardcoded with a cryptographic public/private key pair (e.g., Rivest, Shamir and Adleman (RSA) algorithm) that is stored in a physically protected secure element of the software entity e.g., the eUICC. Additionally, the authenticity of the eUICC and the secrecy of the private key is further attested to by a trusted entity that has issued an "endorsement" certificate for the eUICC key pair. One example of a trusted entity may be e.g., the device manufacturer, a network operator, etc.

As a brief aside, a public/private key pair includes a secret private key, and a published public key. A message encrypted with the public key can only be decrypted using the proper private key. Public/private key schemes are considered "asymmetric", as the key used to encrypt and decrypt are different, and thus the encrypter and decrypter do not share the same key. In contrast "symmetric" key schemes utilize the same key (or trivially transformed keys) for both encryption and decryption. The Rivest, Shamir and Adleman (RSA) algorithm is one type of public/private key pair cryptography that is commonly used within the related arts, but it will be recognized that the present invention is in no way limited to the RSA algorithm or in fact asymmetric techniques.

Since the endorsement key pairs are asymmetric, the public keys can be distributed without compromising the integrity of the private keys. Accordingly, the endorsement key and certificate can be used to protect and verify the communication between previously unknown parties (e.g., the mobile device, and the local carrier update portal).

Successful completion of the foregoing exchange (e.g., mutual verification of the mobile device and the local carrier update portal) ensures that both mobile device and the local carrier update portal are legitimate, and now have a shared session key. The shared session key is used to conduct a secure session between the mobile device and the local carrier update portal.

Referring back to FIG. 4, at step 404, the mobile device requests, or is instructed to download one or more components. In one embodiment various components may be pre-loaded into the mobile device, to minimize the necessary download size. For example, in one exemplary embodiment, commonly used (including those components which are common across different full OS's and eSIMs), and large sized portions are pre-loaded into a mobile device during manufacture; pre-loaded portions do not need to be downloaded and can reduce package size. Accordingly, the mobile device does not have to download components which have been pre-loaded.

In one incarnation, the update portal analyzes the update request (e.g., eSIM download, operating system download, user account data download, etc.), user account information, associated plans and services, and identification data and responsively generates an appropriate update package. In some variants, the update request is authorized and/or verified before generating the update package.

At step 406, the update package is prepared. In one embodiment, the update is split up into multiple packages for easier delivery. At step 408, the update package(s) is/are securely delivered over the air to the target. These packages may include, in whole or in part, operating system components, access control clients, user account data, etc. In one exemplary embodiment, the mobile device downloads and/or updates an access control client. In one variant, the access control client is eSIM. Various types of eSIMs are configured to emulate SIM (Subscriber Identity Module), USIM (Universal Subscriber Identity Module), RUIM (Removable User Identity Module), etc. In some embodiments, the access control client may be determined at the time of transfer, such as via a postponement scheme described within co-owned, co-pending U.S. patent application Ser. No. 12/353,227 filed on Jan. 13, 2009, and entitled "POSTPONED CARRIER CONFIGURATION", previously incorporated by reference in its entirety.

In other embodiments, the mobile device downloads and/or updates an operating system (OS) or OS components. For example, such operating system components may include a public or private key, a new cryptographic algorithm, an updated procedure for secure access, a new device certificate, one or more other trusted vendor certificates, etc. For example, it is appreciated that an access module that verifies the identity of a communicating party, and grants a level of access commensurate with the verified identity, may have any number of modifications to the methods of verification, and/or the levels of access that may be granted.

In yet other variants, the operating system components are configured to support access control operation, but are not directly related to access control. For example, common OS services include file input and output, file management, memory allocation, etc.

At step 408, upon receiving and authenticating the package(s), the mobile device assembles and updates the components. Thereafter, the mobile device can establish a subscriber session with the newly assembled/updated access control client, where the subscriber session enables use of the operator's wireless network services. For example, an updated mobile device can activate an updated eSIM to make voice calls, receive and transmit user data, etc.

Figure 5:
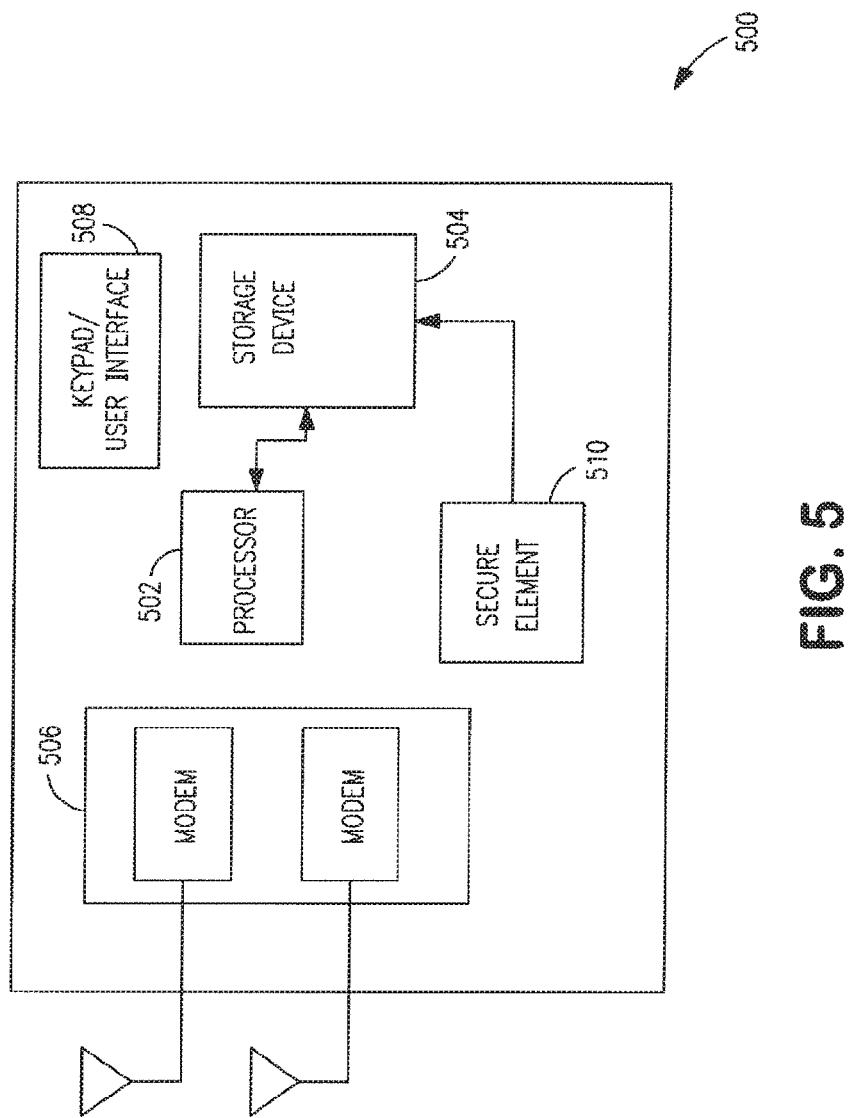
FIG. 5 is a block diagram of an exemplary apparatus useful for implementing the methods of the present invention.

Referring now to FIG. 5, exemplary apparatus 500 useful for implementing the methods of the present invention is illustrated.

The exemplary UE apparatus of FIG. 5 is a wireless device with a processor subsystem 502 such as a digital signal processor, microprocessor, field-programmable gate array, or plurality of processing components mounted on one or more substrates. The processing subsystem may also include an internal cache memory. The processing subsystem is connected to a memory subsystem 504 including memory, which may for example, include SRAM, flash and SDRAM components. The memory subsystem may implement one or a more of DMA type hardware, so as to facilitate data accesses as is well known in the art. The memory subsystem contains computer-executable instructions which are executable by the processor subsystem.

In one exemplary embodiment of the present invention, the device can include of one or more wireless interfaces (506) adapted to connect to one or more wireless networks. The multiple wireless interfaces may support different radio technologies such as GSM, CDMA, UMTS, LTE/LTE-A, WiMAX, WLAINT, Bluetooth, etc. by implementing the appropriate antenna and modem subsystems.

The user interface subsystem 508 includes any number of well-known I/O including, without limitation: a keypad, touch screen (e.g., multi-touch interface), LCD display, backlight, speaker, and/or microphone. However, it is recognized that in certain applications, one or more of these components may be obviated. For example, PCMCIA card-type client embodiments may lack a user interface (as they could piggyback onto the user interface of the host device to which they are physically and/or electrically coupled).

In the illustrated embodiment, the device includes a secure element 510 which contains and operates the eUICC application. The eUICC is capable of storing and accessing a plurality of access control clients, where the access control clients are configured to authenticate the user to a respective network. The secure element is accessible by the memory subsystem at the request of the processor subsystem. The secure element may also include a so-called "secure microprocessor" or SM of the type well known in the security arts.

Furthermore, various realizations of the eUICC include an access module configured to establish a secure connection between the mobile device and a portal. In some embodiments, the eUICC can establish a secure connection to a portal, without the benefit of an existing eSIM, and even after the user equipment is deployed. In one variant, the device has a distinct asymmetric endorsement key pair which is separate from the symmetric key associated with any single eSIM (and the MNO issuing the eSIM).

Referring back to FIG. 5, in one exemplary embodiment, the access module is capable of receiving and storing components for use with one or more access control clients. In one exemplary embodiment, the secure element has an associated endorsement key. This endorsement key is used to protect and verify the communication between the mobile device and an external update portal. In one such variant, the endorsement key is a private key of an asymmetric public/private key pair. The counterpart public key can be freely distributed without compromising the integrity of the private key. In one such variant, the device is assigned a public/private key. In another such variant, the device internally generates a public/private key pair. In alternate variants, the endorsement key is based on a symmetric key algorithm. The endorsement key must be carefully distributed to ensure the integrity of the endorsement key.

Furthermore, various realizations of the exemplary embodiment include a bootstrap operating system that is further configured to select at least one access control client for operation. In one variant, the bootstrap operating system may verify the integrity of the access control client before execution. Furthermore, in one embodiment, the bootstrap OS is configured to selectively store, select and execute, at least one of multiple access control clients. In particular, various implementations of the present invention are adapted to store multiple eSIMs, and selectively enable an eSIM for operation with the current network carrier.

While the foregoing methods and apparatus for delivering an electronic identification components to a cellular device are illustrated over a cellular network, it is readily appreciated by those of ordinary skill, that other distribution schemes may be similarly substituted. For example, in other variants, the electronic identification components may be a distributed over a local area network, or personal area network.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for enabling a mobile device to access wireless services, the method comprising:
at the mobile device:
accessing first identification data associated with a secure element included in the mobile device, wherein the secure element stores a pre-loaded at least one partial electronic Subscriber Identity Module (eSIM) having at least one missing component, and the at least one partial eSIM is a virtualization of a physical SIM card;
authenticating with an eSIM server using the first identification data to allow the mobile device to access a package that includes the at least one missing component;
receiving the package from the eSIM server; and
combining the at least one missing component with the at least one partial eSIM to establish a complete eSIM to allow the mobile device to access wireless services provided by a Mobile Network Operator (MNO).

2. The method of claim 1, wherein the steps further include:
receiving second identification data from the eSIM server; and
verifying the second identification data prior to receiving the package.

3. The method of claim 2, wherein the first identification data and the second identification data are based on a cryptographic key protocol.

4. The method of claim 1, wherein the at least one partial eSIM includes components that are common across other eSIMs, and the at least one missing component includes credentials that are associated with a subscriber of the MNO.

5. The method of claim 1, wherein, subsequent to establishing the complete eSIM, the mobile device is permitted to access one or more wireless services using the complete eSIM.

6. The method of claim 5, wherein accessing the one or more wireless services comprises placing or receiving a phone call.

7. The method of claim 5, wherein accessing the one or more wireless services comprises carrying out a wireless data transmission.

8. A non-transitory computer readable storage medium configured to store instructions that, when executed by a processor included in a mobile device, cause the mobile device to access wireless services, by carrying out steps that include:
accessing first identification data associated with a secure element included in the mobile device, wherein the secure element stores a pre-loaded at least one partial electronic Subscriber Identity Module (eSIM) having at least one missing component, and the at least one partial eSIM is a virtualization of a physical SIM card;
authenticating with an eSIM server using the first identification data to allow the mobile device to access a package that includes the at least one missing component;
receiving the package from the eSIM server; and
combining the at least one missing component with the at least one partial eSIM to establish a complete eSIM to allow the mobile device to access wireless services provided by a Mobile Network Operator (MNO).

9. The non-transitory computer readable storage medium of claim 8, wherein the steps further include:
receiving second identification data from the eSIM server; and
verifying the second identification data prior to receiving the package.

10. The non-transitory computer readable storage medium of claim 9, wherein the first identification data and the second identification data are based on a cryptographic key protocol.

11. The non-transitory computer readable storage medium of claim 8, wherein authenticating with the eSIM server comprises establishing an authorized data session between the mobile device and the eSIM server and performing a mutual verification.

12. The non-transitory computer readable storage medium of claim 11, wherein the mutual verification comprises a cryptographic key protocol.

13. The non-transitory computer readable storage medium of claim 8, wherein the at least one partial eSIM includes components that are common across other eSIMs, and the at least one missing component includes credentials that are associated with a subscriber of the MNO.

14. A mobile device, comprising:
a secure element with a pre-loaded at least one partial electronic subscriber identity module (eSIM) having at least one missing component, wherein the at least one partial eSIM is a virtualization of a physical SIM card; and
a hardware processor configured to cause the mobile device to carry out steps that include:
accessing first identification data associated with the secure element;
authenticating with an eSIM server using the first identification data to allow the mobile device to access a package that includes the at least one missing component;
receiving the package from the eSIM server; and
combining the at least one missing component with the at least one partial eSIM to establish a complete eSIM to allow the mobile device to access wireless services provided by a Mobile Network Operator (MNO).

15. The mobile device of claim 14, wherein the steps further include:
receiving second identification data from the eSIM server; and
verifying the second identification data prior to receiving the package.

16. The mobile device of claim 15, wherein the first identification data and the second identification data are based on a cryptographic key protocol.

17. The mobile device of claim 14, wherein the at least one partial eSIM includes components that are common across other eSIMs, and the at least one missing component includes credentials that are associated with a subscriber of the MNO.

18. The mobile device of claim 14, wherein, subsequent to establishing the complete eSIM, the mobile device is permitted to access one or more wireless services using the complete eSIM.

19. The mobile device of claim 18, wherein accessing the one or more wireless services comprises placing or receiving a phone call.

20. The mobile device of claim 18, wherein accessing the one or more wireless services comprises carrying out a wireless data transmission.

\* \* \* \* \*